(12) United States Patent
Ledoux et al.

(10) Patent No.: US 10,340,496 B2
(45) Date of Patent: Jul. 2, 2019

(54) CONNECTING POLE FOR A RECHARGEABLE BATTERY, RECHARGEABLE BATTERY HOUSING AND MACHINE FOR PRODUCING A CONNECTING POLE

(71) Applicant: Johnson Controls Autobatterie GmbH & Co. KGAA, Hannover (DE)

(72) Inventors: Anne-Laure Ledoux, Langenhagen (DE); Peter Streuer, Hannover (DE)

(73) Assignee: Johnson Controls Autobatterie GmbH & Co. KGAA (DE)

( * ) Notice: Subject to any disclaimer, the term of this patent is extended or adjusted under 35 U.S.C. 154(b) by 0 days.

(21) Appl. No.: 15/988,033

(22) Filed: May 24, 2018

(65) Prior Publication Data

US 2018/0269462 A1      Sep. 20, 2018

Related U.S. Application Data

(62) Division of application No. 14/353,606, filed as application No. PCT/EP2012/070440 on Oct. 16, 2012, now Pat. No. 10,003,066.

(30) Foreign Application Priority Data

Oct. 25, 2011   (DE) .................. 10 2011 054 773

(51) Int. Cl.
    *H01M 2/26*     (2006.01)
    *H01M 2/06*     (2006.01)
    *H01M 2/30*     (2006.01)

(52) U.S. Cl.
    CPC .............. *H01M 2/26* (2013.01); *H01M 2/06* (2013.01); *H01M 2/307* (2013.01); *Y10T 29/53135* (2015.01)

(58) Field of Classification Search
    CPC .......... H01M 2/26; H01M 2/307; H01M 2/06; Y10T 29/53135
    See application file for complete search history.

(56) References Cited

U.S. PATENT DOCUMENTS 5,545,935 A      8/1996  Stewart
6,644,084 B1 *  11/2003  Spiegelberg ........... B21H 7/182
                                                72/112

(Continued)

FOREIGN PATENT DOCUMENTS

CN      101150181 A      3/2008
DE      16719999 B1     11/1971

(Continued)

OTHER PUBLICATIONS

International Search Report and Written Opinion dated Jan. 28, 2013, received in International Application No. PCT/EP/12/70440.

*Primary Examiner* — Lisa S Park
(74) *Attorney, Agent, or Firm* — Boardman & Clark LLP

(57) ABSTRACT

The invention relates to a connecting pole (1) for a rechargeable battery (12) having the following features: a) the connecting pole (1) has a connecting section (2), in which a pole terminal can be fastened on the connecting pole (1), b) the connecting pole (1) has a fastening section (3), in which the connecting pole (1) can be fastened in a housing part (5) of the rechargeable battery (12), c) the fastening section (3) has a labyrinth section (4), d) the outer wall (6) of the connecting pole (1) has, in the labyrinth section (4), one or more peripheral projections (7, 8, 10), e) at least two adjacently arranged peripheral projections (70, 71, 72, 73, 80, 81, 82, 83) are flanged in pairs in the mutually facing direction, wherein a recess (11) is formed on each of the peripheral projections (70, 71, 72, 73, 80, 81, 82, 83) with respect to the outer wall (6) of the connecting pole (1) by the flanged region. The invention also relates to a rechargeable (Continued)

Figure 1:
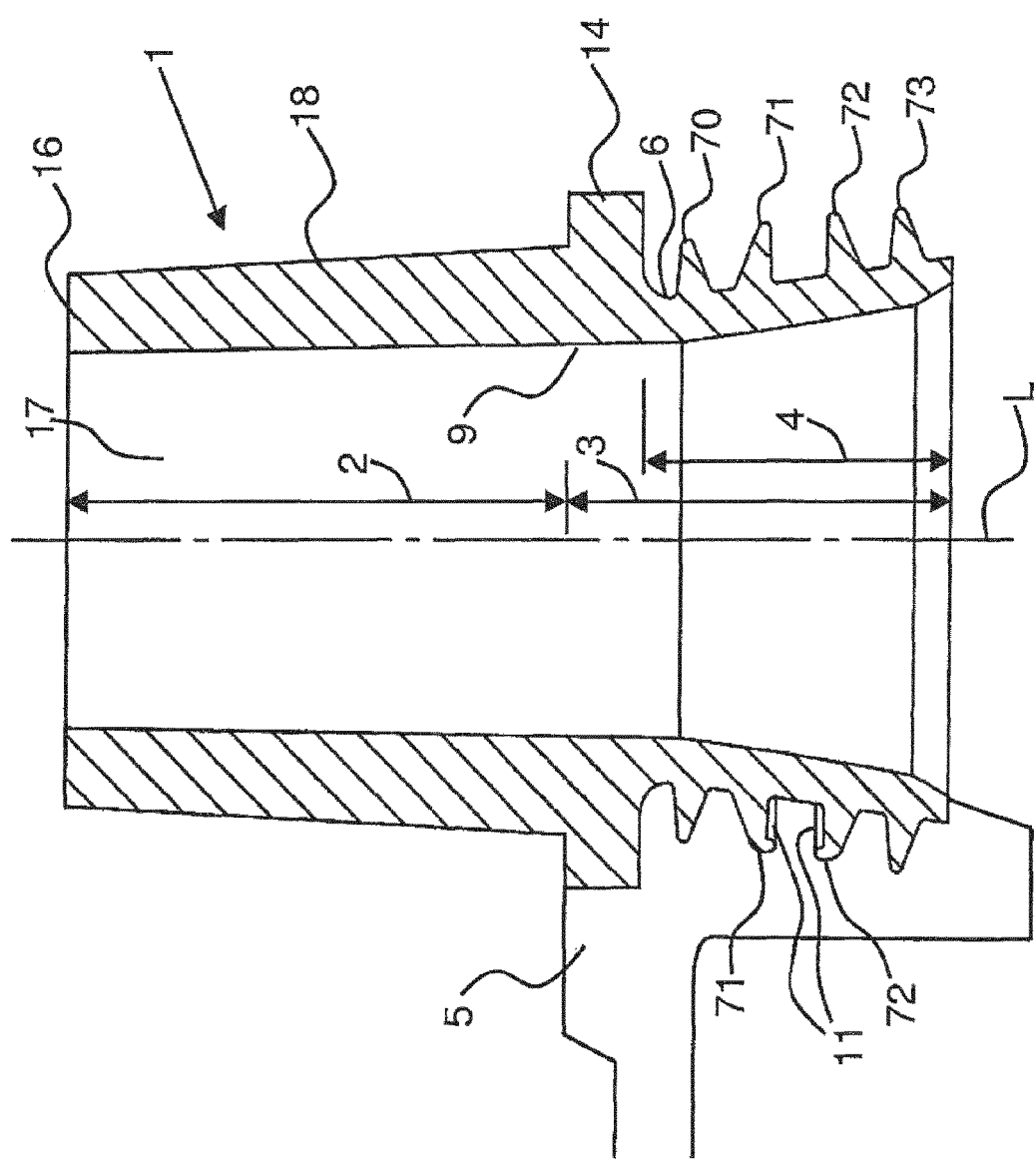

battery housing or a part thereof with at least one such connecting pole and to a machine for producing such a connecting pole.

10 Claims, 4 Drawing Sheets

(56) References Cited

U.S. PATENT DOCUMENTS

| | | |
|---|---|---|
| 10,003,066 B2 | 6/2018 | Ledoux et al. |
| 2002/0039678 A1* | 4/2002 | Higa .................... H01M 2/024 429/183 |
| 2003/0224248 A1 | 12/2003 | Spiegelberg et al. |
| 2007/0122696 A1 | 5/2007 | Richter et al. |
| 2008/0038633 A1 | 2/2008 | Ratte et al. |
| 2010/0116455 A1 | 5/2010 | Ratte et al. |
| 2010/0291435 A1* | 11/2010 | Garin .................... H01M 2/305 429/180 |

FOREIGN PATENT DOCUMENTS

| | | |
|---|---|---|
| DE | 4241393 C2 | 5/1999 |
| DE | 102005046256 A1 | 4/2007 |
| DE | 102010010772 A1 | 9/2011 |
| EP | 0601268 A1 | 6/1994 |
| EP | 1768201 A3 | 12/2007 |

\* cited by examiner

CONNECTING POLE FOR A RECHARGEABLE BATTERY, RECHARGEABLE BATTERY HOUSING AND MACHINE FOR PRODUCING A CONNECTING POLE

RELATED APPLICATIONS

This application is a divisional of United States Non-Provisional Patent Application No. 14/353,606 filed Aug. 22, 2014, which is a national stage entry of International Application No. PCT/EP/2012/070440 filed Oct. 16, 2012, which claims priority to German Application No. 102011054773.8 filed Oct. 25, 2011, the entire contents of each of which are incorporated herein by reference in their entirety.

The invention relates to a connecting pole for a rechargeable battery in accordance with the preamble of claim 1. The invention further relates to a rechargeable battery housing or a section thereof having at least one such connecting pole in accordance with claim 6 as well as a machine for manufacturing such a connecting pole in accordance with claim 7.

Connecting poles for rechargeable batteries serve to establish an electrical contact between the rechargeable battery and electrical devices which the rechargeable battery is to supply with power. In the case of a starter battery for a motor vehicle, the corresponding pole terminals are screwed to two connecting poles of the starter battery.

A connecting pole for a rechargeable battery is known from DE 42 41 393 C2. The connecting pole described therein comprises a base part having peripheral grooves which can be inserted into a housing of the rechargeable battery. The peripheral grooves form a labyrinth seal with a plastic material which fills the grooves.

The invention is based on the objective of specifying a connecting pole suitable for forming a labyrinth seal with a plastic material which is of simpler and more economical manufacture.

This objective is accomplished by the invention as specified in claims 1, 6 and 7. Advantageous embodiments of the invention are set forth in the subclaims.

Claim 1 proposes a connecting pole for a rechargeable battery having the following features:
a) the connecting pole comprises a connecting section in which a pole terminal can be attached to the connecting pole,
b) the connecting pole comprises an attachment section in which the connecting pole can be attached in a section of the rechargeable battery housing,
c) the attachment section comprises a labyrinth section,
d) the outer wall of the connecting pole exhibits one or more peripheral projections in the labyrinth section,
e) at least two adjacently arranged peripheral projections are flanged in pairs in the mutually facing direction, wherein the flanged region forms an undercut on each peripheral projection in relation to the outer wall of the connecting pole.

The term "section" herein refers to sections in the longitudinal direction of the connecting pole; i.e. in the direction of the longitudinal axis L depicted in FIG. 1.

The invention has the advantage of specifying a connecting pole with a labyrinth section having peripheral projections which can be manufactured in simpler and thereby more economical manufacturing steps. While it is necessary to produce the projections with a hook-like profile in the connecting pole cited at the outset, e.g. by cylindrical or flat die rolling of the corresponding section of the connecting pole, such laborious measures are able to be dispensed with in the case of the inventive connecting pole. This allows simpler and more economical tools to be used, particularly a flanging tool for the paired flanging of two adjacently arranged peripheral projections toward each another. Because two peripheral projections are in each case flanged in pairs toward one another, the flanging tool works substantially in the absence of thrust load since the respective flanging forces essentially cancel each other out. In addition, compared to the known manufacturing methods, time is also saved when manufacturing the connecting pole. All of this leads to lower manufacturing costs. Undercuts can hereby be easily produced on the outer wall of the connecting pole which form an optimal barrier against acid seeping from the rechargeable battery after the connecting pole is embedded in the injection molding material of the rechargeable battery housing.

The flanged region of the peripheral projections can be flanged in uniform or non-uniform, i.e. sinuous, manner. Particularly advantageous is for a uniform flanged region of the peripheral projection to form a continuous ring around the outer wall of the connecting pole.

The invention can be advantageously realized both in a connecting pole for a passenger car battery as well as in a connecting pole for a commercial vehicle battery (for commercial vehicles).

The peripheral projection(s) in the labyrinth section can in principle be realized with different profiles. An annular form is cited as the basic form for the peripheral projection. One or more of the peripheral projections can also exhibit a hook-shaped profile.

According to one advantageous further development, the flanging only produces one single undercut per peripheral projection; i.e. an asymmetrical profile to the peripheral projection results. This is particularly advantageous to the manufacture.

Advantageous for the economical manufacture of the connecting pole is to first produce the peripheral projection without undercuts. According to one advantageous further development of the invention, it is therefore provided for the at least two adjacently arranged peripheral projections to otherwise be free of undercuts; i.e. aside from the flanged region. This allows simple and quick manufacture of the connecting pole from an e.g. cylindrical or tubular connecting pole blank, in which the peripheral projections are worked in first without undercuts in an extrusion press step. The connecting pole can also be manufactured with peripheral projections initially free of undercuts in a molding process. At least two adjacently arranged peripheral projections can thereafter be flanged in pairs in the mutually facing direction in a flanging step, whereby a respective undercut is then formed.

According to one advantageous further development of the invention, one or two further peripheral projections are arranged in the labyrinth section. Providing the one or two further peripheral projections has the advantage of improving the labyrinth's sealing action. It has been shown that too many peripheral projections does not lead to further improvement but only increases the manufacturing costs and reduces the stability of the peripheral projections. In a connecting pole of conventional design, it is advantageous for the distance between two adjacent peripheral projections to be in the range of 0.8 to 2 mm, whereby a value of approximately 1.5 mm has proven optimum. To ensure secure and stable embedding of the connecting pole in the material of the housing section, the spacings should not be too large. Spacings too close together diminish the extent to which the grooves formed between the peripheral projections can be filled within the injection molding material of the housing section, particularly when polypropylene (PP) is used as the material. Peripheral projections spaced too close together are hereby disadvantageous for the influent action of the injection molding material into the grooves.

According to one advantageous further development of the invention, the connecting pole comprises a peripheral projection having a system of teeth on the outer periphery in the attachment section between the connecting section and the labyrinth section. The tooth system can advantageously realize an anti-rotation means to prevent unwanted rotating of the connecting pole in the material of the rechargeable battery housing. In one advantageous further development of the invention, the tooth system has teeth numbering from 6 to 9. It has particularly been shown that 8 teeth is particularly advantageous and yields a good compromise between the mechanical stability of the connecting pole teeth and the stability of the connecting pole in the plastic material of the rechargeable battery housing. Too many teeth inevitably leads to reduced dimensions of each individual tooth, whereby the stability of the individual teeth decreases. Too few teeth leads to a decrease in anti-rotation effectiveness since the stability of the connecting pole in the plastic material of the rechargeable battery housing is reduced.

The invention further relates to a rechargeable battery housing or a section thereof comprising at least one connecting pole of the above-described type, wherein the at least one connecting pole with attachment section is embedded in a rechargeable battery housing section by injection molding.

The invention further relates to a machine for manufacturing a connecting pole of the above-described type. The machine is thereby designed to integrally form on a blank a labyrinth section having one or more peripheral projections in the attachment section on the outer wall of the connecting pole by means of at least one extrusion press step. Such an extrusion press step can be realized with simple tools and at higher processing speeds than the rolling step cited at the outset.

The cited blank can be of e.g. cylindrical, truncated conical or tubular shape; i.e. already having an inner cavity. Should the blank not yet have an inner cavity, such as the case for example with a solid cylinder or truncated cone, the machine is advantageously designed to first form a small central cavity in the blank in a first extrusion press step, e.g. with a thin borer tool. The machine is further designed to enlarge the small cavity just produced with a larger borer tool in a second extrusion press step, which hereby concurrently serves centering purposes. The integral forming of the peripheral projections can then ensue at the same time during the second extrusion press step.

According to one advantageous further development of the invention, the machine is designed to flange at least two adjacently arranged peripheral projections in pairs in the mutually facing direction in a subsequent flanging step.

The connecting pole can alternatively also be manufactured in a molding process. In this case, the machine is designed to form a connecting pole having a labyrinth section with one or more peripheral projections on the outer wall of the connecting pole in a molding process.

The following will reference drawings based on embodiments in describing the invention in greater detail.

Shown are

Figure 2:
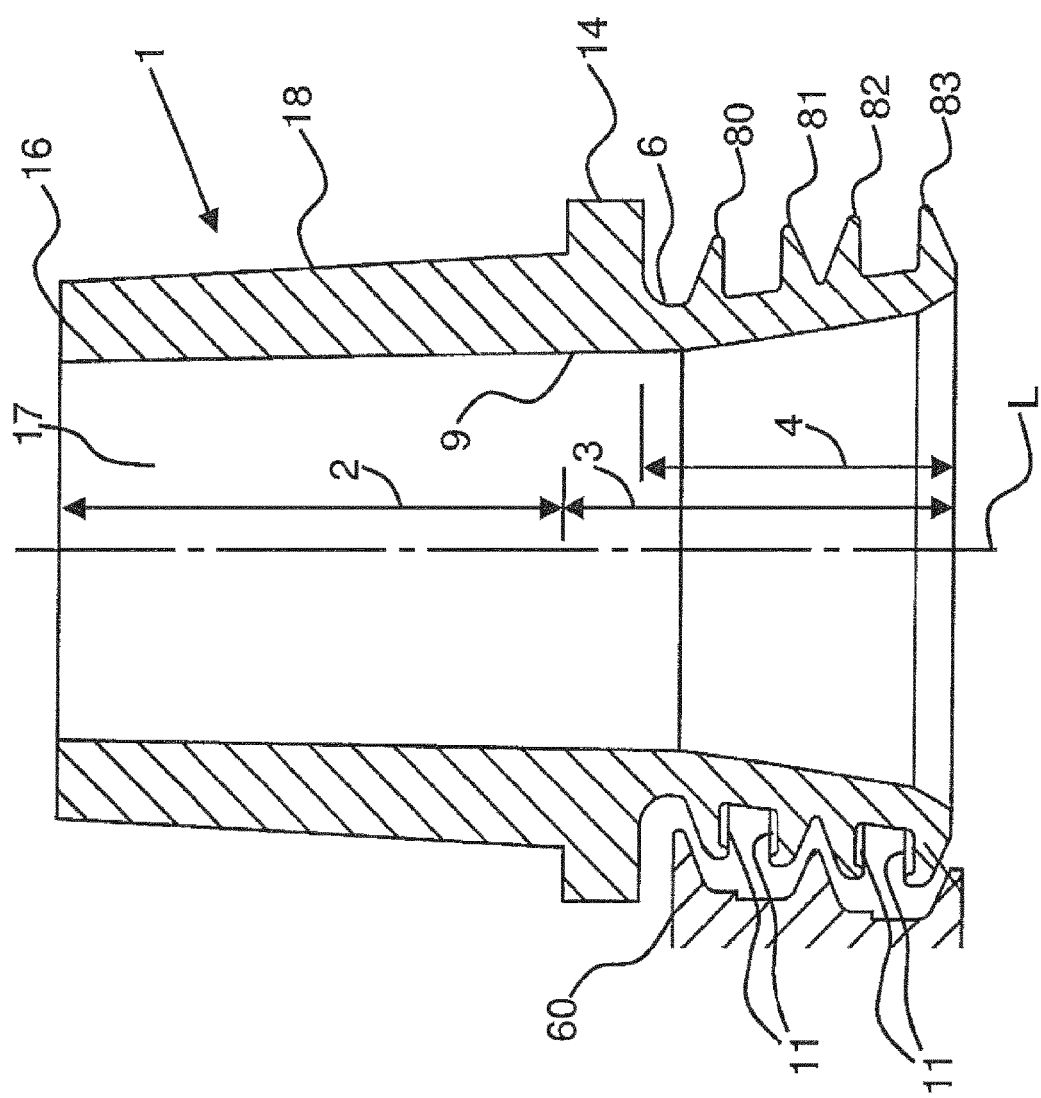
Figure 3:
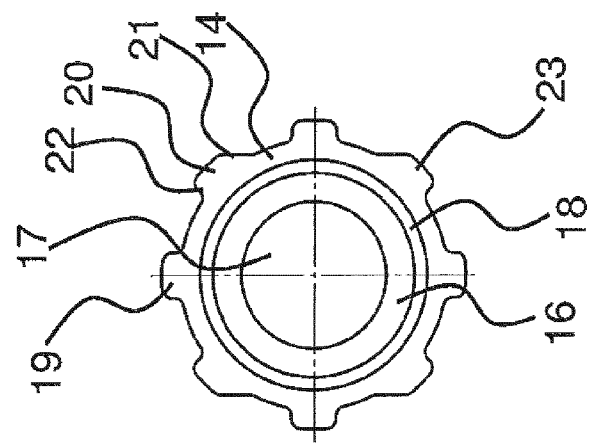
Figure 3:
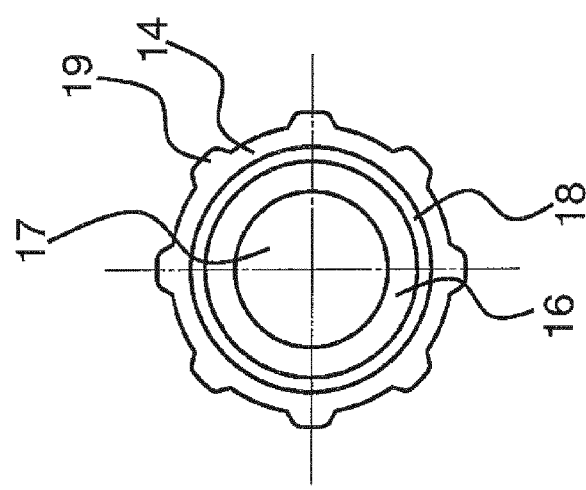
Figure 3:
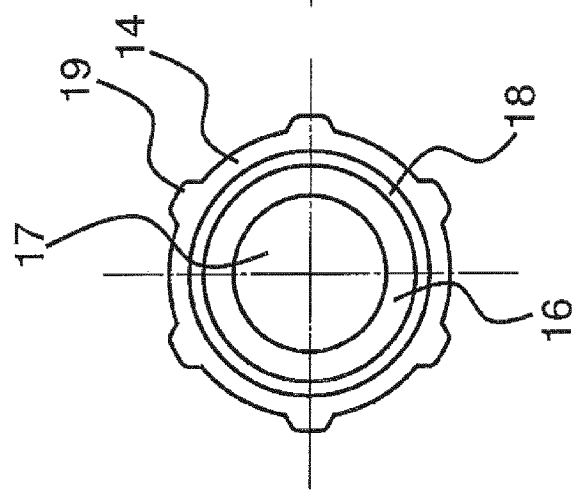
Figure 4:
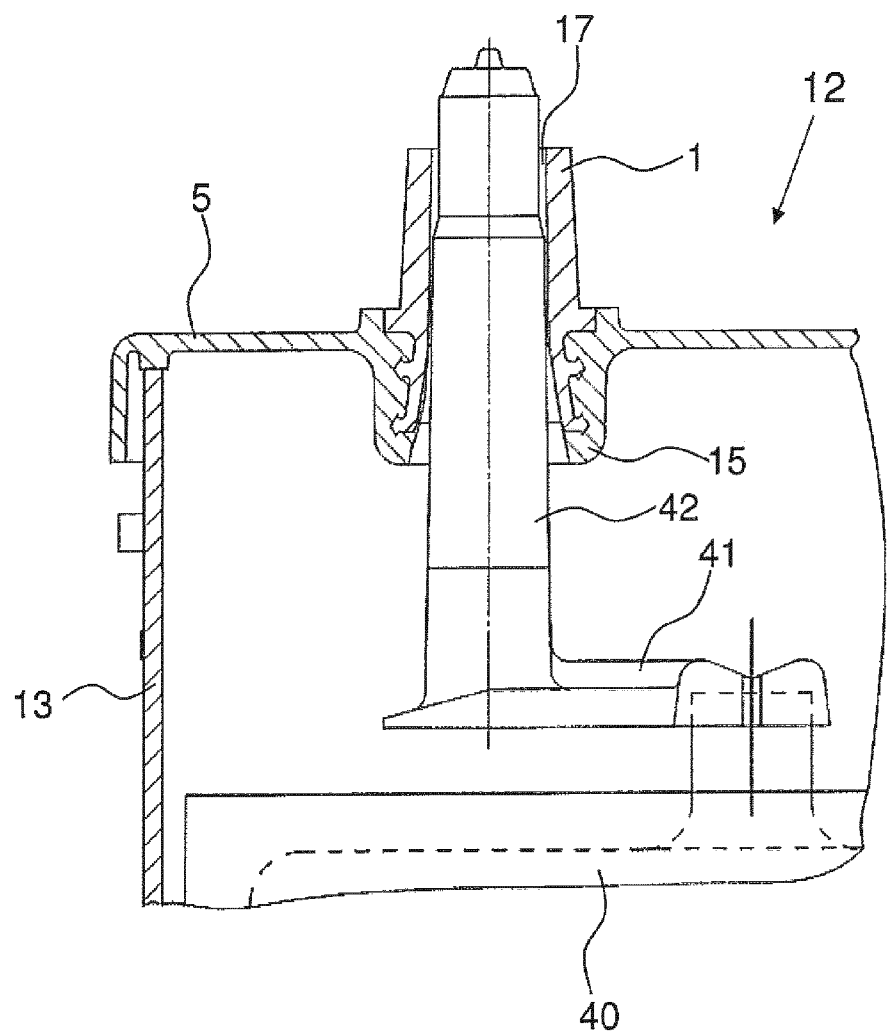

FIG. 1 a sectional view of a connecting pole in the longitudinal direction,

FIG. 2 a sectional view of a further embodiment of a connecting pole in the longitudinal direction, FIG. 3 a top plan view of embodiments of the connecting pole according to FIGS. 1-2, and FIG. 4 a sectional view of a rechargeable battery comprising a connecting pole.

In the figures, the same reference numerals are used for elements which correspond to one another.

FIGS. 1 and 2 show respective embodiments of the connecting pole 1, in which the right side of same are depicted with still unflanged peripheral projections; i.e. in the connecting pole's state following molding or extrusion pressing. The same connecting pole 1 is depicted subsequent the flanging process on the respective left side of FIGS. 1 and 2; i.e. with peripheral projections respectively flanged in pairs.

FIG. 1 shows a connecting pole 1 in a longitudinal sectional view. The connecting pole 1 comprises a connecting section 2, an attachment section 3 and a labyrinth section 4. The connecting pole 1 has an outer wall 18 and an upper terminal surface 16 on its exterior in connecting section 2. A peripheral projection 14 which can be of e.g. annular shape is arranged on the exterior of the connecting pole 1 in attachment section 3 adjacent connecting section 2. The peripheral projection 14 can also exhibit the system of teeth still to be described in greater detail below on its outer periphery. An outer wall 6 on the exterior of connecting pole 1 arranged in labyrinth section 4 adjoins the peripheral projection 14. The outer wall 6 is interrupted by peripheral projections 70, 71, 72, 73. Aside from the system of teeth, the connecting pole 1 can be designed for example as a substantially rotationally symmetric component.

As can be seen in FIG. 1, in the intermediate state depicted on the right during manufacture, in which none of the peripheral projections 70, 71, 72, 73 have yet been flanged, the connecting pole 1 comprises a pair of adjacently arranged peripheral projections 71, 72 of asymmetrical profile which are already slightly oriented toward one another. These peripheral projections 71, 72 are then flanged in the nose area with a flanging tool, e.g. with a rolling tool guided around the connecting pole 1, as is shown on the left of FIG. 1. It can be recognized here that the peripheral projections 71, 72 are to be flanged in succession, whereby undercuts are formed in regions 11. The injection molding material can collect in the undercuts 11 when the connecting pole is embedded in the material of the rechargeable battery housing, whereby particularly good sealing is obtained. On the left of the connecting pole 1, FIG. 1 shows exemplary sections of a housing section 5 of the rechargeable battery integrally formed on the connecting pole 1 in an injection molding process. As is recognizable, the exterior of the connecting pole 1 is embedded in the material of the housing section 5 in attachment section 3. The peripheral projections 70, 71, 72, 73 form a labyrinth which provides for good sealing of the rechargeable battery interior relative to the environment.

The connecting pole 1 is of hollow inner design and comprises a cavity 17. The inner cavity 17 serves for the introduction of a pole body, as will be described below in conjunction with FIG. 4.

FIG. 2 shows a further embodiment of a connecting pole 1 in a comparable view to that of FIG. 1 which provides, in contrast to the embodiment of FIG. 1, a first pair of peripheral projections 80, 81 and a second pair of peripheral projections 82, 83 underneath. The pairs 80, 81 and 82, 83 respectively are in each case of comparable design to the peripheral projections 71, 72 according to FIG. 1. As can be seen on the left in FIG. 2, a schematically depicted flanging tool 60, e.g. in the form of a rolling tool, flanges the pairs 80, 81 and 82, 83 respectively of peripheral projections are flanged to mutually face each other, whereby a total of four regions 11 with undercuts are produced.

In all the embodiments, the undercuts 11 of a pair of peripheral projections 70, 71, 72, 73, 80, 81, 82, 83 produced by the flanging face each other; i.e. point toward each other.

In FIGS. 3a), 3b) and 3c), FIG. 3 shows different embodiments of the connecting pole 1 in top plan view, specifically from the terminal surface 16 side. The upper terminal surface 16, outer side wall 18, inner cavity 17 as well as the peripheral projection 14 are recognizable in all three embodiments.

The peripheral projection 14 comprises an external system of teeth, illustrated by teeth 19, 20, 23. The teeth 19, 20, 23 prevent the connecting pole from rotating in the plastic material of the rechargeable battery housing. FIG. 3a) hereby depicts one advantageous embodiment in which the six teeth 19 are in a uniformly distributed arrangement over the periphery of the connecting pole 1. FIG. 3b) depicts one advantageous embodiment with eight teeth 19 in a uniformly distributed arrangement over the periphery of the connecting pole 1.

FIG. 3c) insofar corresponds to the embodiment according to FIG. 3b), whereby teeth 20, 23 having asymmetrical tooth flanks 21, 22 are provided in FIG. 3c) as an advantageous further development. Tooth flank 21 thus has a smaller angle relative to the outer periphery of peripheral projection 14 than tooth flank 22. Tooth 23 is of comparable design to tooth 20 with asymmetrical tooth flanks. Tooth 23 is hereby arranged mirror symmetrically to tooth 20. The tooth flanks 21 of smaller angle provide the opportunity to manufacture the connecting pole using a split mold. The cheeks can thereby be readily separated from the connecting pole upon its removal from the mold since there is no undercut in the direction of separation.

In a method for manufacturing a connecting pole, a labyrinth section having one or more peripheral projections is first formed on a blank in the attachment section on the outer wall of the connecting pole by means of at least one extrusion press step. In a subsequent flanging step directly or indirectly following the extrusion press step, adjacently arranged peripheral projections are flanged toward one another in pairs. The flanging step can advantageously be realized with a peripheral rolling tool 60 rolled around the connecting pole 1. The connecting pole is thereby held in a fixing device. This allows the inventive connecting pole to be manufactured quickly and efficiently.

The cited blank can be of e.g. cylindrical, truncated conical or tubular shape; i.e. already having an inner cavity. Should the blank not yet have an inner cavity, such as the case for example with a solid cylinder or truncated cone, the method comprises at least two extrusion press steps. In a first extrusion press step, a small central cavity in first formed in the blank, for example with a thin borer tool. In a second extrusion press step, the small cavity just produced is then enlarged with a larger borer tool, which hereby concurrently serves centering purposes. The integral forming of the peripheral projections can then ensue at the same time during the second extrusion press step.

The connecting pole 1 can also be alternatively manufactured in a molding process.

FIG. 4 shows a section of a rechargeable battery 12 comprising the battery case 13 and cover part 5 housing components. The cover part 5 is set on top of the battery case 13. Electrode plates forming a plate set 40 are provided in the interior of the battery case 13. The plate set 40 is electrically and mechanically connected to a pole body 42 by means of a connector 41. As can be seen, the pole body 42 is introduced into the inner cavity 17 of the connection socket 1 and projects somewhat at the exterior of the rechargeable battery 12 from the connection socket 1 embedded in cover part 5. The pole body 42 is dimensioned with a somewhat smaller diameter in this area than in the other areas. An annular space is thereby formed between the pole body 42 and the connection socket 1. This annular space serves in electrically and mechanically connecting the pole body 42 and the connection socket 1, e.g. by welding.

The invention claimed is:

1. A connecting pole for a rechargeable battery, the connecting pole comprising:
   a connecting section in which a pole terminal can be attached to the connecting pole,
   an attachment section in which the connecting pole can be attached in a housing section of a rechargeable battery,
   labyrinth section,
   an inner wall wherein the entirety of the inner wall has a smooth surface, and
   an outer wall comprising one or more peripheral projections in the labyrinth section, wherein at least two adjacently arranged peripheral projections are flanged in pairs in the mutually facing direction, wherein at least one flanged projection forms a hook-shaped profile, wherein flanging only produces one single undercut having a hook-shaped profile per peripheral projection, resulting in an asymmetrical profile of the peripheral projection.

2. The connecting pole according to claim 1, characterized in that the peripheral projections provided with the undercut by flanging are otherwise free of undercuts.

3. The connecting pole according to claim 1, characterized in that at least one non-flanged peripheral projection is respectively arranged above and/or below a pair of flanged peripheral projections.

4. The connecting pole according to claim 1, characterized in that each of the at least two pairs of flanged peripheral projection are adjacently arranged.

5. A rechargeable battery housing or a section thereof comprising at least one connecting pole in accordance with claim 1, wherein the at least one connecting pole with attachment section is embedded in a rechargeable battery housing section by injection molding.

6. A method for manufacturing a connecting pole according to claim 1, comprising:
   integrally forming on a blank a labyrinth section having one or more peripheral projections in the attachment section on the outer wall of the connecting pole by at least one extrusion press step or molding process.

7. A machine which performs the method of claim 6.

8. A battery having the connecting pole of claim 1.

9. A connecting pole for a rechargeable battery, the connecting pole comprising:
   a connecting section in which a pole terminal can be attached to the connecting pole,
   an attachment section in which the connecting pole can be attached to a battery housing,
   a labyrinth section,
   an inner wall wherein the entirety of the inner wall has a smooth surface, and
   one or more peripheral projections provided on an outer wall of the connecting pole in the labyrinth section, wherein at least two adjacently arranged peripheral projections are flanged in pairs in the mutually facing direction, wherein at least one flanged projection forms a hook-shaped profile and the peripheral projection has an asymmetrical profile.

10. A battery having the connecting pole of claim 9.

* * * * *